(12) United States Patent
Schmid et al.

(10) Patent No.: US 8,342,022 B2
(45) Date of Patent: Jan. 1, 2013

(54) MICROMECHANICAL ROTATIONAL SPEED SENSOR

(75) Inventors: Bernhard Schmid, Friedberg (DE); Stefan Guenthner, Frankfurt (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 672 days.

(21) Appl. No.: 12/225,009

(22) PCT Filed: Mar. 12, 2007

(86) PCT No.: PCT/DE2007/000445
§ 371 (c)(1),
(2), (4) Date: Sep. 10, 2008

(87) PCT Pub. No.: WO2007/104289
PCT Pub. Date: Sep. 20, 2007

(65) Prior Publication Data
US 2009/0031806 A1  Feb. 5, 2009

(30) Foreign Application Priority Data
Mar. 10, 2006 (DE) .......................... 10 2006 012 610

(51) Int. Cl.
*G01C 19/56* (2012.01)
(52) U.S. Cl. .................................................. 73/504.12
(58) Field of Classification Search ............... 73/504.12, 73/504.04, 504.14
See application file for complete search history.

(56) References Cited

U.S. PATENT DOCUMENTS

| | | | |
|---|---|---|---|
| 4,598,585 A | 7/1986 | Boxenhorn | |
| 4,699,006 A | 10/1987 | Boxenhorn | |
| 5,065,628 A | 11/1991 | Benecke | |
| 5,259,247 A | 11/1993 | Bantien | |
| 5,313,835 A | 5/1994 | Dunn | |
| 5,349,858 A | 9/1994 | Yagi et al. | |
| 5,392,650 A * | 2/1995 | O'Brien et al. ............ | 73/514.18 |
| 5,639,973 A | 6/1997 | Okada | |
| 5,707,077 A | 1/1998 | Yokota et al. | |
| 5,719,336 A | 2/1998 | Ando et al. | |
| 5,801,313 A | 9/1998 | Horibata et al. | |
| 5,864,063 A | 1/1999 | Otani et al. | |
| 5,894,091 A | 4/1999 | Kubota | |
| 5,895,850 A * | 4/1999 | Buestgens .................. | 73/504.12 |
| 5,895,852 A * | 4/1999 | Moriya et al. ............. | 73/504.12 |

(Continued)

FOREIGN PATENT DOCUMENTS

DE     41 26 100     2/1993

(Continued)

OTHER PUBLICATIONS

R. Puers et al. "Electrostatic Forces and Their Effects on Capacitive Mechanical Sensors", Sensors and Actuators, A56 (1996), pp. 203 to 210.

(Continued)

*Primary Examiner* — John Chapman, Jr.
(74) *Attorney, Agent, or Firm* — W. F. Fasse (57) ABSTRACT

A micromechanical rotational rate sensor includes a substrate, at least one base element suspended by at least one spring element on the substrate, an excitation device and a read-out arrangement. The base element includes at least one seismic or inertial mass. The spring element is movable perpendicularly to the motion direction of the base element so that apex or deflection points of the spring element will move perpendicularly to the excitation direction while the base element is thereby not excited to move perpendicularly to the excitation direction.

18 Claims, 5 Drawing Sheets

U.S. PATENT DOCUMENTS

| | | | |
|---|---|---|---|
| 5,905,203 | A | 5/1999 | Flach et al. |
| 6,122,965 | A | 9/2000 | Seidel et al. |
| 6,336,658 | B1 | 1/2002 | Itoigawa et al. |
| 6,349,597 | B1 | 2/2002 | Folkmer et al. |
| 6,469,909 | B2 | 10/2002 | Simmons |
| 6,841,992 | B2 | 1/2005 | Yue et al. |
| 6,978,673 | B2 * | 12/2005 | Johnson et al. ............ 73/504.12 |
| 7,343,801 | B2 | 3/2008 | Kapser et al. |
| 2005/0024527 | A1 | 2/2005 | Chiou |
| 2006/0021436 | A1 | 2/2006 | Kapser et al. |

FOREIGN PATENT DOCUMENTS

| | | |
|---|---|---|
| DE | 196 37 265 | 3/1998 |
| DE | 196 41 284 | 5/1998 |
| DE | 197 09 520 | 9/1998 |
| EP | 0 244 581 | 11/1987 |
| GB | 2 186 085 | 8/1987 |
| GB | 2 212 274 | 7/1989 |
| JP | 08-184448 | 7/1996 |
| JP | 09-318649 | 12/1997 |
| JP | 11-304834 | 11/1999 |
| JP | 2000-9470 | 1/2000 |
| WO | WO 03/104823 | 12/2003 |
| WO | WO2005/017445 | 2/2005 |

OTHER PUBLICATIONS

PCT International Preliminary Report on Patentability, PCT/DE2007/000445, issued Oct. 23, 2008.

Japanese Office Action in Japanese Patent Application 2009-503398 issued on Mar. 27, 2012, Japanese Patent Office, 4 pages, with partial English translation, 2 pages.

* cited by examiner

MICROMECHANICAL ROTATIONAL SPEED SENSOR

FIELD OF THE INVENTION

The present invention relates to a micromechanical rotational rate sensor having at least one spring-suspended oscillating seismic mass, an oscillation excitation device and a read-out arrangement.

BACKGROUND INFORMATION

Rotational rate or yaw sensors are typically used in order to determine an angular velocity or rotational rate of an object about an axis. If the rotational rate sensor is produced micromechanically on the basis of a silicon substrate, it offers the advantage, for example relative to a gyroscope manufactured by precision engineering, that it can be produced with very small dimensions at relatively low costs. A relatively small measuring uncertainty and a small energy consumption during the operation are further advantages. An important area of application of rotational rate sensors is in the field of automobile technology, for example in connection with driving dynamics regulation systems such as the electronic stability program (ESP). In that regard, an anti-lock system, an automatic braking force distribution, a drive or traction slip regulation, and a yaw moment regulation operate cooperatively so that a transverse and lengthwise stabilization of the motor vehicle is achieved by the targeted braking of individual wheels. Thereby it is possible to prevent a rotation of the motor vehicle about its vertical axis. A further application for rotational rate sensors is in the so called rollover detection of a motor vehicle in connection with airbag control units and restraint systems for vehicle passengers. Furthermore, rotational rate sensors are used for navigation purposes as well as for the determination of the position or orientation and the state of motion of motor vehicles of all types. Other fields of use are, for example, image stabilization devices for video cameras, dynamic regulation of satellites during deployment or insertion into the earth orbit path, or in civil air traffic in backup position regulation systems.

Micromechanically produced rotational rate sensors generally comprise a seismic or inertial mass, which is set into an oscillation or vibration by an excitation means. If the seismic mass in a rotating system moves radially inwardly or outwardly, then its path or trajectory velocity changes. It thus experiences a tangential acceleration, which is caused by the Coriolis force. The reaction of the seismic mass to the rotation can be detected, for example, by means of a read-out arrangement.

The international publication WO 03/104823 A1 discloses a multi-axis monolithic acceleration sensor with up to four seismic masses, that are embodied in the form of paddles and are suspended via torsion springs on a frame. With this sensor, accelerations in the direction of the respective main sensitivity axes, but no rotational rates or speeds, can be measured.

From the German patent DE 196 41 284 C1, a micromechanical rotational rate sensor is known, with a substrate, a base element suspended by several spring elements on the substrate, an excitation means and a read-out arrangement, wherein the base element comprises a seismic mass and the spring element is embodied as a linear spring. Such micromechanically produced rotational rate sensors are preferably etched out of a silicon block. Thereby, even very small deviations in the manufacturing accuracy lead to flank angles of the respective structures. During a deflection of the spring elements, the flank angles cause a motion of the base element perpendicular to its excitation, thus namely in the measuring direction of the rotational rate sensor. This leads to very high demands or requirements on the manufacturing accuracy, or to a very high reject rate of the structures that are, for example, etched out of a silicon wafer. Moreover, complex or costly electronic evaluating circuits are required in order to compensate the measuring inaccuracies caused by the flank angles.

SUMMARY OF THE INVENTION

The object underlies the present invention, to provide a micromechanical rotational rate sensor that is to be produced economically with a small reject rate and that has a high measuring accuracy.

This object is achieved according to the invention, in a micromechanical rotational rate sensor with a substrate, at least one base element suspended by at least one spring element on the substrate, an excitation means and a read-out arrangement, wherein the base element comprises at least one seismic mass, in that at least one spring element is movable perpendicularly to the motion direction of the base element. Thereby, in the inventive rotational rate sensor, essentially only apex or reversal points of the spring elements will rise or fall during an excited motion of the base element, that is to say a motion of the spring elements occurs instead of a deflection of the base element perpendicularly to the excitation direction.

Preferably the spring element comprises at least two spring sections. The spring element is especially embodied U-shaped (three spring sections), V-shaped (two spring sections) or S-shaped (several spring sections).

In the preferred embodiment of the present invention, a base element is suspended on four spring elements. In that regard, the spring elements are especially arranged mirror-symmetrically on the base element.

With several base elements, the spring elements of neighboring base elements are advantageously couplable by means of a coupling spring.

As base elements it is possible to use rigid base elements, in which frame and seismic mass are rigidly connected. It is, however, also possible according to the invention, that a base element comprises a frame, a seismic mass and at least one suspension of the seismic mass on the frame. The seismic masses are then, for example, embodied as paddles.

Inventive micromechanical rotational rate sensors can be embodied as an X-axis sensor, Z-axis sensor or as an XZ-axis sensor, which can sense rotational motions about the X-axis, the Z-axis or about both axes.

BRIEF DESCRIPTION OF THE DRAWINGS

In the following description, the characteristic features and details of the invention will be explained more closely in connection with the accompanying drawings with reference to example embodiments. In that regard, characteristic features and relationships described in individual variants are basically transferable to all example embodiments. In the drawings, it is shown by.

DETAILED DESCRIPTION OF EXAMPLE EMBODIMENTS OF THE INVENTION

Figure 1:
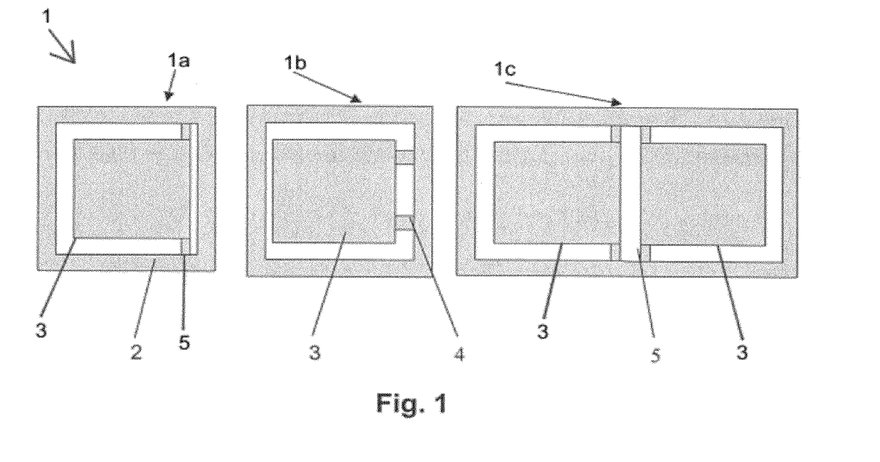
FIG. 1 in a schematic view, three examples of different base elements with seismic masses embodied as paddles.

FIG. 1 shows three different example embodiment forms 1a, 1b and 1c of a general base element 1, which can find application in the present invention. A base element 1 comprises preferably one or more seismic or inertial masses 3 suspended in a frame 2. The suspension can be realized, for example, via bending beams 4 as in the example base element 1b, or torsion beams 5 as in the example base elements 1a and 1c. Bending beams 4 of the example base element 1b have a linear spring characteristic curve, but the seismic masses 3 of the inventive rotational rate sensors can, however, be secured on the frame via torsion beams 5 as in example base elements 1a and 1c. Namely, one or more seismic masses 3 can be embodied as paddles with oppositely located torsion beams 5 forming the suspension. More specifically, example base element 1a has a single seismic mass 3 suspended by two torsion beams 5, example base element 1b has a single seismic mass 3 suspended by two bending beams 4, and example base element 1c has two seismic masses 3 that are each suspended by two torsion beams 5.

The suspension 4, 5 permits a motion of the center of gravity of the seismic mass 3 only in the Z-direction perpendicular to the plane of the frame 2. The plane of the frame 2 is parallel to the substrate or to the plane (X/Y plane) spanning through the substrate.

Figure 2:
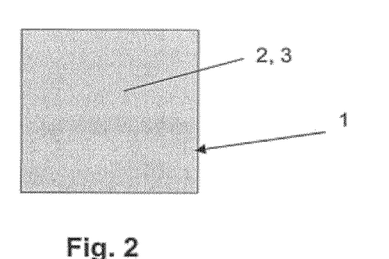
FIG. 2 a schematic view of a rigid base element.

In FIG. 2, a rigid base element 1 is shown, in which frame 2 and seismic mass 3 are rigidly connected as a unit.

Figure 3:
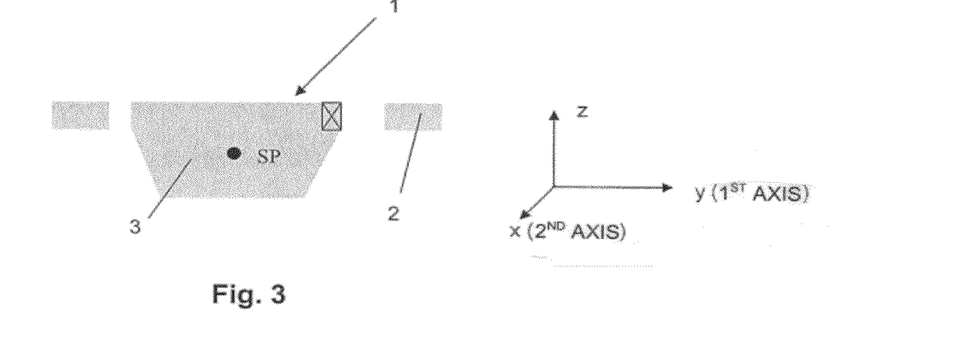
FIG. 3 a schematic view of a further form of a base element.

According to FIG. 3, one or more seismic masses 3 can also be suspended on a stiff frame 2. This suspension, for example via torsion springs or bending springs, permits a motion of the center of gravity SP of the seismic mass 3 only in a direction perpendicular to the frame plane (Z-direction), whereby the center of gravity SP of the seismic mass 3 lies outside of the frame plane. The frame plane (X-Y plane) is parallel to the substrate.

Figure 4:
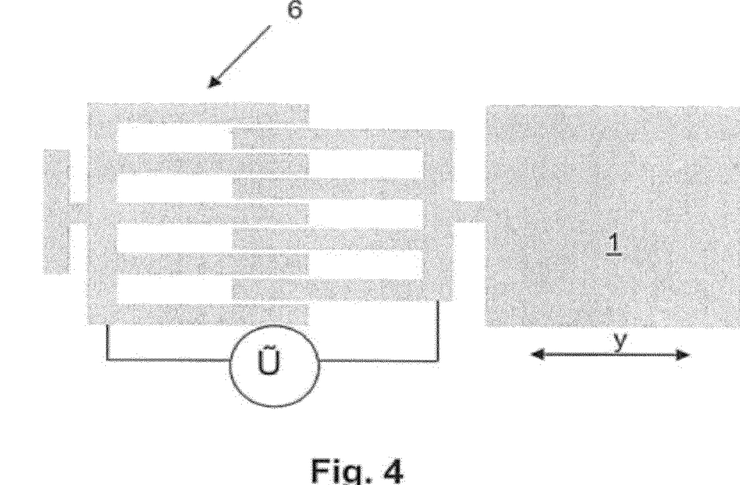
FIG. 4 an example embodiment of an excitation means with a comb structure.

According to FIG. 4, the excitation of the base element 1 can be achieved via a comb structure as an excitation device 6, to which a voltage U is applied. An excitation means or device 6 is a device or arrangement that can excite the base element 1 to undergo oscillations or vibrations along the primary or first axis (Y-axis), which can, for example, occur electrically, thermally, magnetically or piezoelectrically.

Figure 5:
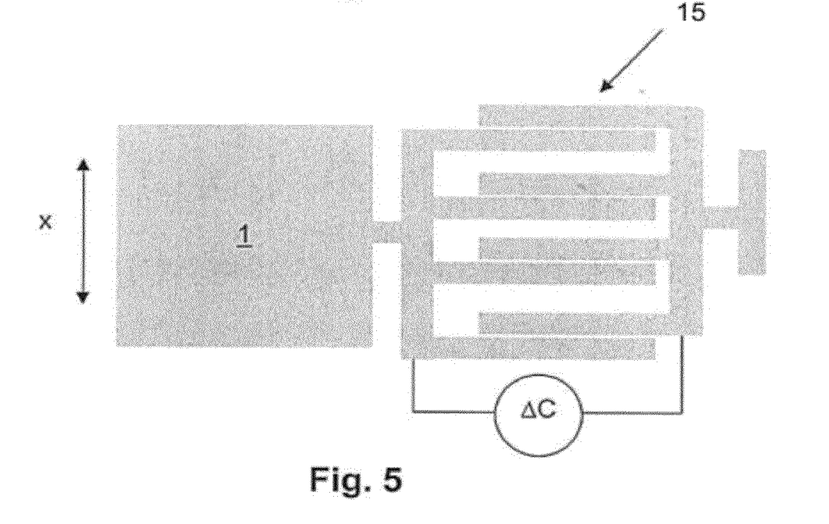
FIG. 5 a schematic view of a read-out arrangement regarding the motion in the substrate plane.
Figure 6:
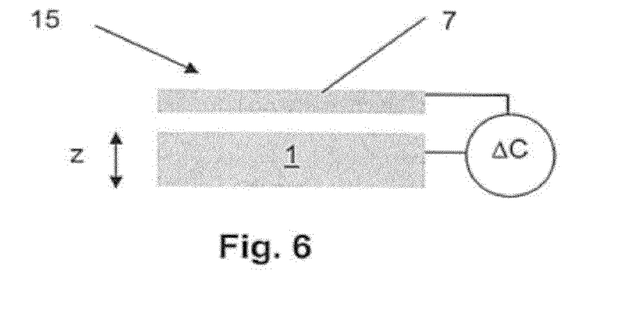
FIG. 6 a schematic view of a capacitively operating read-out arrangement.

Two different read-out arrangements 15 are schematically shown in FIGS. 5 and 6. By means of the read-out arrangement 15, a deflection of the seismic mass or of the base element 1 perpendicular or parallel to the frame plane can be measured, which can occur capacitively, piezoresistively, magnetically, piezoelectrically or also optically. A motion in the substrate plane can be measured with the read-out arrangement 15 according to FIG. 5, and a motion perpendicular to the substrate plane can be measured with the read-out arrangement 15 according to FIG. 6 using a counter electrode 7 spaced in the Z direction from the base element 1.

Figure 7:
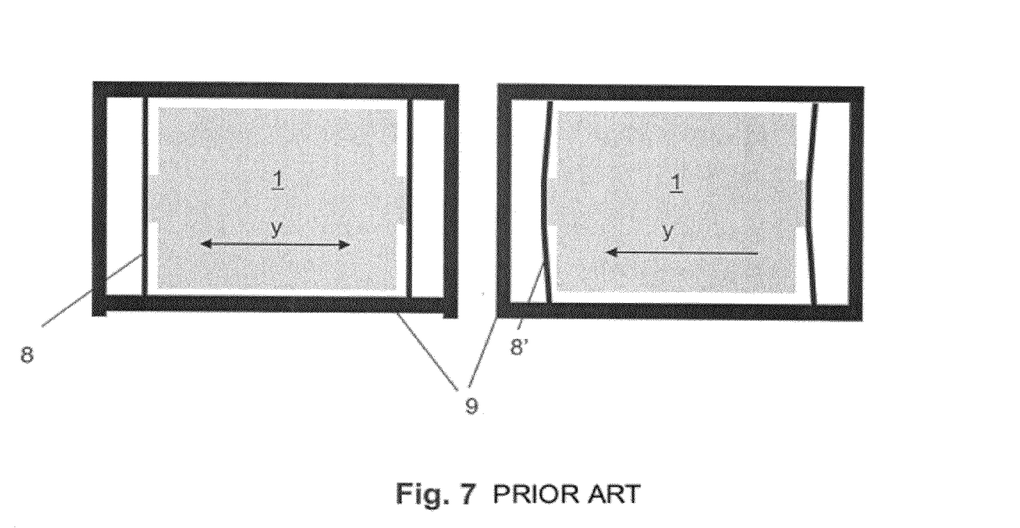
FIG. 7 in a schematic view, a micromechanical rotational rate sensor with linear spring elements according to the prior art.

FIG. 7 shows a conventional concept that is known from the prior art, for the suspension of base elements 1 in a substrate 9. The known suspension occurs via linear spring elements 8. The spring element 8 is shown in its neutral position in the left side of FIG. 7, and the spring element 8' is shown deflected in the right half. Generally, under the term suspension one understands an arrangement of spring elements that are secured to the base element 1 on the one hand, and to the substrate 9 or other elements on the other hand. The spring elements permit a motion of the base element 1 in the direction of a primary or first axis (Y-direction) parallel to the substrate 9.

Figure 8:
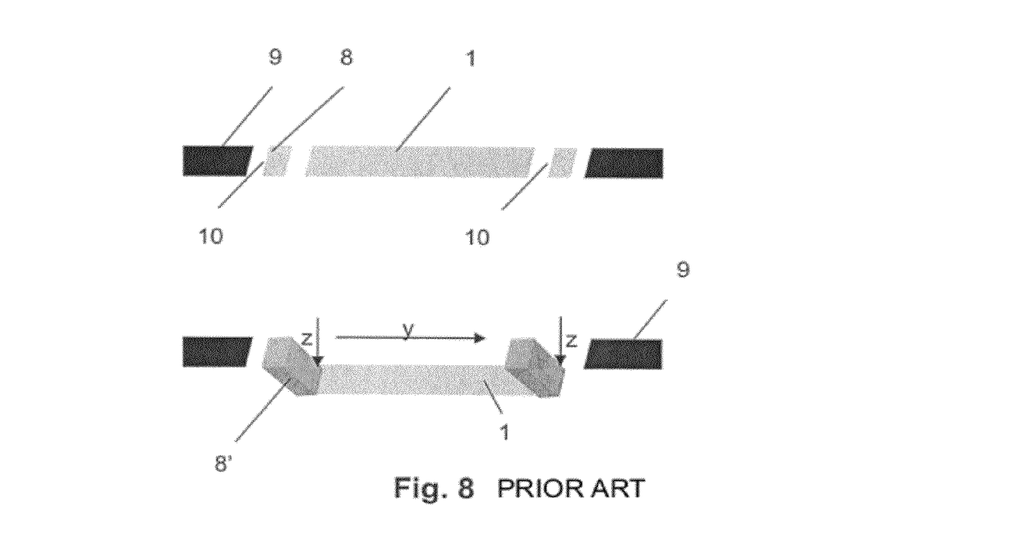
FIG. 8 in a schematic view, the deflection, caused by the flank angle, of the base element from FIG. 7.

If the flanks of the spring elements 8, 8' according to FIG. 8 are tipped or tilted at a flank angle 10, then there arises not only a motion of the spring elements 8' in the substrate plane along the first axis (Y-direction), but rather also out of this plane (Z-direction). In the conventional concept shown in FIG. 7, this has the result that the base element 1 is lifted more or less parallel out of the substrate plane. In the measuring principle shown in FIG. 6, in which the motion out of the plane is used for the detection of the inertial forces, this effect means the generation of a signal or a capacitance change or variation 1c even without a corresponding external force influence. This leads to a high measuring inaccuracy, so that too-large flank angles 10 of the tilted spring elements 8, 8' make the rotational rate sensor unusable.

Figure 9:
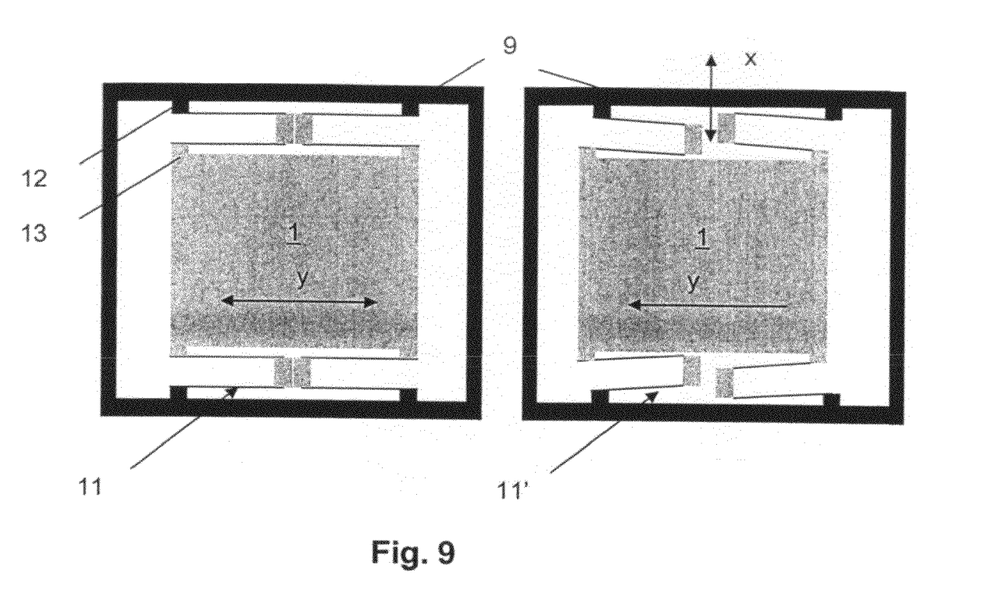
FIG. 9 in a schematic view, an example embodiment of the present invention with inventive spring elements.
Figure 10:
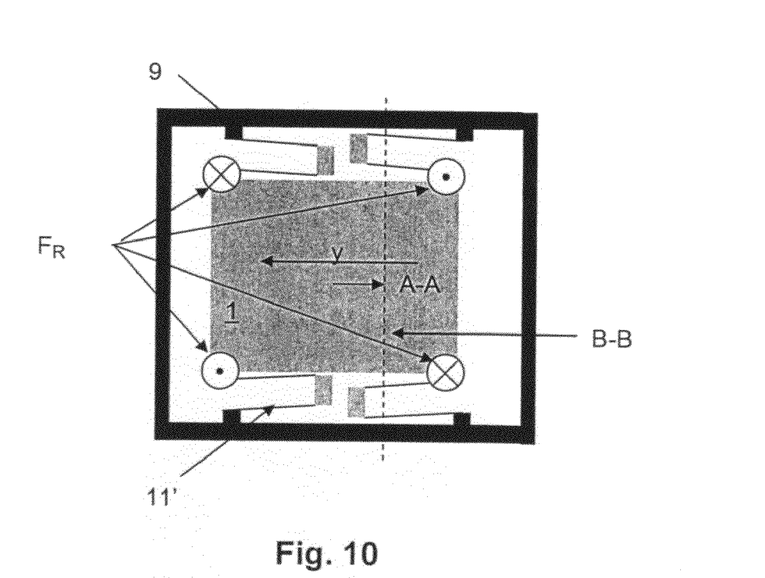
FIG. 10 a schematic view of the right portion of FIG. 9 with reaction forces.

An inventive micromechanical rotational rate sensor is shown in FIGS. 9 and 10. In the left side of FIG. 9 the spring elements 11 are located in their neutral position, in the right side the spring elements 11' are shown deflected. The spring elements 11, 11' are suspended on the substrate 9 at the point 12, and on the base element 1 at the point 13. FIG. 10 shows the reaction forces $F_R$ acting or effective on the base element 1. As shown in FIG. 9, the points 12 are embodied as four mounting studs or substrate mounting protrusions 12 that protrude from the substrate 9 toward the base element 1 in a transverse direction X perpendicular to the oscillation direction Y that extends parallel to a pair of side edges of the base element 1, and the points 13 are embodied as four mounting studs or base mounting protrusions 13 that protrude from the side edges of the base element toward opposite ones of the substrate mounting protrusions 12. As also shown in FIG. 9, each spring element 11, 11' includes first and second spring legs extending parallel to the side edges of the base element 1, and a junction piece that joins together distal ends of the first and second spring legs, while proximal ends of the first spring legs are connected directly to the substrate mounting protrusions 12 and proximal ends of the second spring legs are connected directly to the base mounting protrusions 13. Also note in the neutral position, the protrusions 12 are aligned with the opposite protrusions 13 along respective connection axes and the spring elements are each confined to only one half-plane bounded along the connection axis. As further shown in FIG. 9, a width of the mounting protrusions 12 and 13 in the Y-direction is greater than a width of the spring legs in the X-direction, and a length of the mounting protrusions 12 and 13 in the X-direction is less than a length of the spring legs in the Y-direction. With this arrangement, the mounting studs or protrusions are less flexible than the spring legs, and the advantageous motion characteristic of an embodiment of the invention can be achieved.

Figure 11:
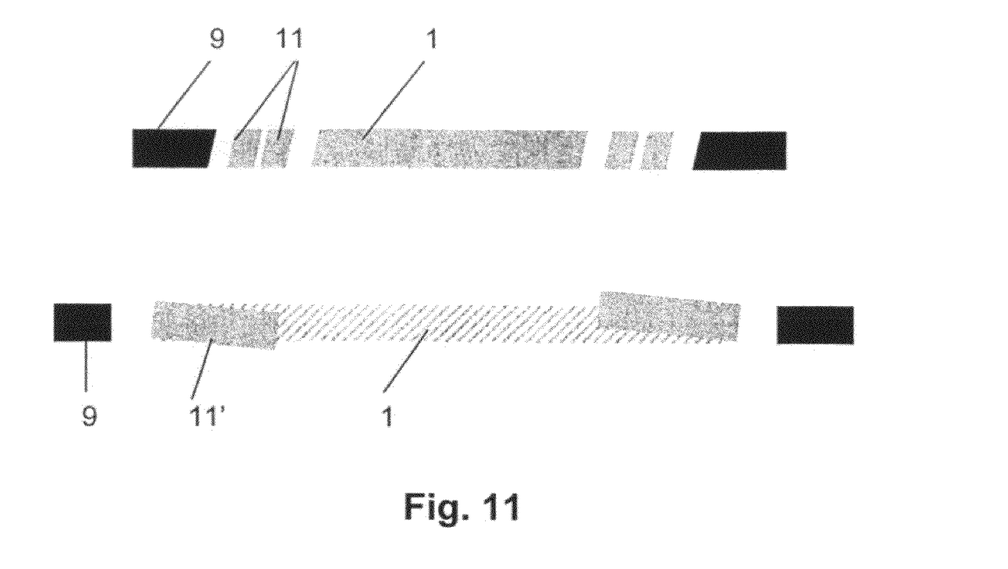
FIG. 11 in the upper portion a section along the line A-A of FIG. 10, and in the lower portion a section along the line B-B.

The essential advantage of the present invention will be explained more closely in connection with FIG. 11. In that regard, the upper half of FIG. 11 shows a sectional view along the line A-A of FIG. 10, and the lower half a sectional view along the line B-B. First a tipping or tilting about the primary or first axis (Y-axis) will be discussed. The motions of the spring elements 11, 11' run or extend in the substrate plane perpendicular to the motion of the seismic mass or of the base element 1. In this configuration, essentially only the apex or reversal points of the spring elements 11, 11' are lifted or lowered. Further according to FIG. 10, a preferred spring arrangement consists of four folded spring elements 11, 11' that engage on the respective corners of the base element 1 mirror symmetrically with respect to one another. Thereby the apex points of the spring elements 11, 11' move in a contrary or opposed manner at each corner, when the base element 1 moves in one direction. The resulting reaction forces $F_R$ on the center of gravity of the base element 1 cancel themselves out in an ideal symmetrical arrangement, if the base element 1 is sufficiently rigid. Thus, according to the invention, no motion of the base element 1 and of the seismic masses occurs, because the spring element 11, 11' is movable perpendicularly to the motion direction (X, Y) of the base element 1, in contrast to the prior art shown in FIGS. 7 and 8. In that regard, the geometry of the spring elements 11, 11' is designed so that form fluctuations or variations necessitated by the manufacturing do not or only slightly influence the sensor behavior in an interfering manner.

Preferably the inventive spring element 11, 11' comprises at least two spring sections. The spring element 11, 11' is especially embodied U-shaped (three spring sections, as shown in FIGS. 9 and 10), V-shaped (two spring sections) or S-shaped (several spring sections).

Figure 12:
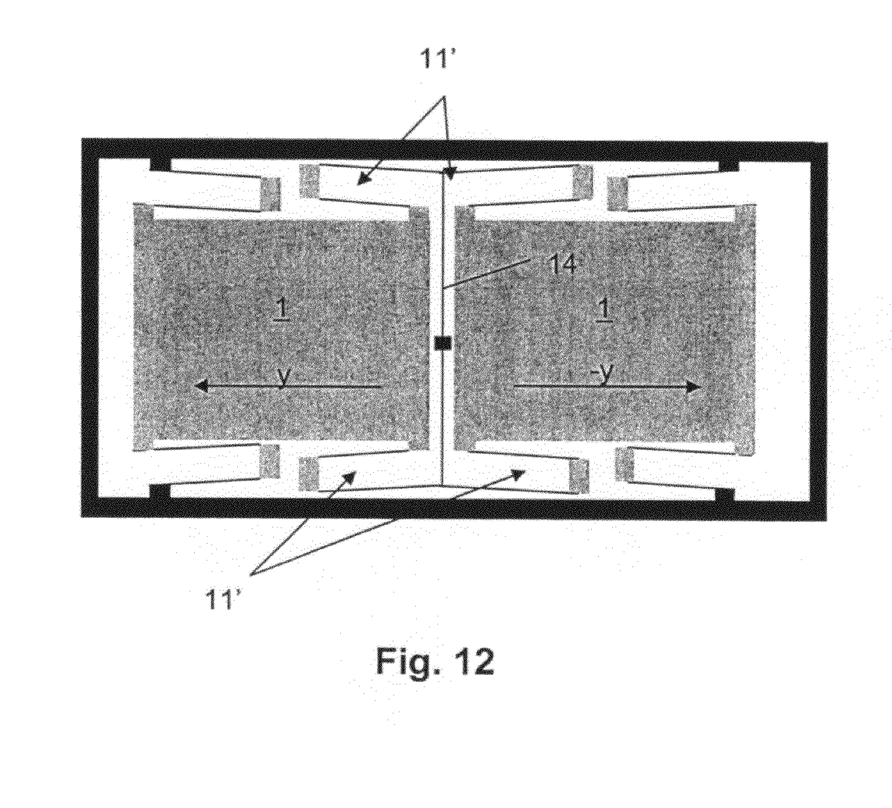
FIG. 12 in a schematic view, a further example embodiment of the present invention with coupled spring elements.

During a tipping or tilting about the secondary or second axis or X-axis, the cross section of the springs of the spring elements 11, 11' remains unchanged, so that no motion out of the substrate plane arises. In the configuration as a two mass oscillator or vibrator shown in FIG. 12, the spring elements 11, 11' of the two neighboring base elements 1 are coupled to one another by a coupling spring 14 instead of being coupled to the substrate 9, as shown in FIG. 12. In this arrangement, while the cross section of the coupling spring 14 is tipped or tilted, nonetheless the influence of the tipping or tilting overall is drastically reduced by the inventive spring concept in comparison to the prior art.

The principle of the inventive rotational rate sensor as a two mass oscillator or vibrator is explained more closely in connection with FIG. 12. The motion of the base elements 1, which are coupled via the spring elements 11' arranged at the top and bottom, occurs phase-shifted 180° relative to one another along the first or primary axis. A common resonance frequency of the two oscillators or vibrators is established via the coupling.

The advantage of the two mass oscillator or vibrator as a rotational rate sensor is that linear accelerations cause a motion of both seismic masses or base elements in the same direction. Coriolis forces acting on the elements are dependent on their directions of motion and thus necessarily cause counter-phased deflections. Thereby, external interfering linear accelerations can be eliminated by signal subtraction, and signals due to rotational motions are added.

Moreover, the center of gravity of the entire arrangement always remains at rest. Thus, the internal drive forces, which excite the base elements 1 to a counter-phased oscillation or vibration, cancel one another out, and the substrate remains at rest. Therefore, in the ideal case, influences of the sensor mounting, for example hard or soft adhesive bonding, are not coupled into the moving masses.

In the following, the functional principle as a rotational rate sensor will be explained. Definition: X- and Y-directions lie in the substrate plane, Z-direction stands perpendicularly on the substrate plane.

X-Axis Sensor:

The base element is excited into periodic oscillations or vibrations along the primary or first axis (Y-axis). During a rotational motion of the sensor about the secondary or second axis (X-axis, in the substrate plane and perpendicular to the first axis), a Coriolis force arises perpendicular to the first and second axis (Z-axis). This acts both on the frame as well as on the seismic mass suspended in it. For base element 1 rigidly incorporating the frame 2 and seismic mass 3 as shown in FIG. 2, the suspension of the frame is designed so that a motion of the base element in the Z-direction is possible. For base elements 1 having one or more seismic masses 3 spring-supported in a frame 2 as shown in FIGS. 1 and 3, the suspension of the frame 2 is predominantly rigid for motion in the Z-direction, but only the seismic mass 3 is deflected in the direction of this axis. The deflection of the base element configurations in the Z-direction is detected with the read-out arrangement, as shown in FIG. 6, and is a measure for the rotational speed that has arisen.

As a Z-Axis Sensor:

The base element is excited into periodic oscillations or vibrations along the primary or first axis (Y-axis). During a rotational motion of the sensor about the third axis (Z-axis, perpendicular to the substrate plane and perpendicular to the first axis), a Coriolis force arises perpendicular to the first and third axis (X-axis). This acts both on the frame as well as on the seismic mass suspended in it.

Variant 1: The suspension of the frame is designed so that a motion in the X-direction is possible, so that the seismic mass is deflected along this axis. The deflection can be measured, for example as shown in FIG. 5.

Variant 2: For base element 1 as shown in FIG. 3, a frame motion in the X-direction is possible but not necessary. Via the displaced center of gravity (SP), the Coriolis force that acts in the X-direction is resolved or divided into a force in the X- as well as in the Z-direction. Thereby the seismic mass 3 is moved in the Z-direction and a measuring arrangement, as in the case of the X-axis sensor, can be utilized as shown in FIG. 6. Thereby it is important, however, that the torsion axis (suspension of the mass on the frame) extends parallel to the first axis and perpendicular to the Coriolis force.

This deflection, either in the Z- or X-direction is proportional to the arising rotational velocity.

As XZ-Axis Sensor:

Variant 1: Combination of above sensors.

Variant 2: The example embodiment of the base element 1c as shown in FIG. 1 includes two masses 3 in one frame, whereby the two masses 3 are oriented reversed by 180° relative to one another.

In the case of a rotational rate in the X-direction, a Coriolis force in the Z-direction arises, which has as a result that both masses are deflected in the same Z-direction (+Z or −Z). The addition of both signals supplies the total signal, the subtraction results in 0.

In the case of a rotational rate in the Z-direction, a Coriolis force in the X-direction arises, which has as a result that one mass is deflected in the +Z-direction and one mass is deflected in the −Z-direction. The addition of the individual signals results in 0, the subtraction supplies the total signal.

REFERENCE NUMBER LIST 1 base element
2 frame 3 seismic or inertial mass
4 suspension of the seismic mass, or bending beam
5 suspension of the seismic mass, or torsion beam
6 excitation means or comb structure
7 counter electrode
8 spring element according to the prior art
8' spring element according to the prior art, deflected
9 substrate
10 flank angle
11 spring element
11' spring element, deflected
12 suspension point of the spring element on the substrate
13 suspension point of the spring element on the base element
14 coupling spring
15 read-out arrangement
A-A section
B-B section
Δc capacitance change
$F_R$ reaction force
SP center of gravity
Ũ voltage
X direction (substrate plane)
Y direction (substrate plane)
Z direction (perpendicular to the substrate plane)

The invention claimed is:

1. A micromechanical rotation rate sensor comprising:
a substrate;
a base element that comprises an inertial mass;
plural spring elements that movably connect and suspend said base element relative to said substrate;
an excitation arrangement that is arranged and cooperates with said base element so as to be adapted to excite said base element into oscillation in an oscillation direction in an oscillation plane; and
a read-out arrangement that is arranged and cooperates with said base element so as to be adapted to sense a motion of said base element in at least one sensing direction perpendicular to said oscillation direction;
wherein each one of said spring elements has at least one bend respectively at at least one vertex point; and
wherein said spring elements are so configured and arranged such that in connection with said oscillation of said base element in said oscillation direction in said oscillation plane said at least one bend deflects perpendicularly to said oscillation plane while said base element is not excited to deflect perpendicularly to said oscillation plane.

2. The micromechanical rotation rate sensor according to claim 1, wherein each one of said spring elements respectively comprises at least two spring legs connected to one another successively at a respective said bend.

3. The micromechanical rotation rate sensor according to claim 2, wherein said spring legs are connected to one another in a U-shaped configuration.

4. The micromechanical rotation rate sensor according to claim 2, wherein said spring legs are connected to one another in a V-shaped configuration.

5. The micromechanical rotation rate sensor according to claim 2, wherein said spring legs are connected to one another in an S-shaped configuration.

6. The micromechanical rotation rate sensor according to claim 1, wherein said base element further comprises a frame and at least one suspension element that movably suspends said inertial mass on said frame.

7. The micromechanical rotation rate sensor according to claim 1, wherein said plural spring elements comprise four spring elements.

8. The micromechanical rotation rate sensor according to claim 7, wherein said spring elements are arranged mirror symmetrically on said base element.

9. The micromechanical rotation rate sensor according to claim 1, further comprising a second base element, plural second spring elements that movably suspend said second base element relative to said substrate, a coupling spring and at least two further spring elements, wherein said base element and said second base element are arranged adjacent one another with said coupling spring element therebetween, and said further spring elements respectively movably connect said base element and said second base element to said coupling spring, whereby said base element and said second base element are coupled to one another through said further spring elements and said coupling spring.

10. The micromechanical rotation rate sensor according to claim 9, wherein said further spring elements are not connected to said substrate.

11. The micromechanical rotation rate sensor according to claim 1, configured, arranged and adapted to sense rotational motions of said micromechanical rotation rate sensor about a rotational axis perpendicular to said oscillation direction and lying in said oscillation plane.

12. The micromechanical rotation rate sensor according to claim 1, configured, arranged and adapted to sense rotational motions of said micromechanical rotation rate sensor about a rotation axis perpendicular to said oscillation plane.

13. The micromechanical rotation rate sensor according to claim 1, configured, arranged and adapted to sense rotational motions of said micromechanical rotation rate sensor respectively about two orthogonal rotation axes that are both perpendicular to said oscillation direction.

14. The micromechanical rotation rate sensor according to claim 1, wherein each respective one of said spring elements is respectively connected to said base element at a respective first connection and is respectively connected to said substrate at a respective second connection, said respective first connection is aligned with said respective second connection along a respective spring connection axis of said respective spring element when said base element is stationary or in a neutral position of said oscillation, said respective spring element comprises plural spring legs respectively connected to one another in succession by said at least one bend, and all of said spring legs and said at least one bend extend along and are confined to only one half-plane having a bounding edge along said respective spring connection axis and extending radially on only one side of said respective spring connection axis.

15. The micromechanical rotation rate sensor according to claim 1, wherein each respective one of said spring elements is respectively connected to said base element at a respective corner of said base element on a side of said base element extending parallel to said oscillation direction, and said respective spring element does not extend outwardly beyond said respective corner of said base element in said oscillation direction.

16. The micromechanical rotation rate sensor according to claim 1, wherein each respective one of said spring elements respectively comprises two spring legs and a vertex leg that interconnects said two spring legs and forms said bend at said vertex point, wherein side surfaces of said spring legs extend at a non-zero acute tilt angle relative to a perpendicular to said oscillation plane, and wherein said vertex leg extends longitudinally at a non-zero acute slope angle relative to said oscillation plane when said bend deflects in a direction perpendicular to said oscillation plane.

17. The micromechanical rotation rate sensor according to claim 1, wherein each respective one of said spring elements respectively includes a spring leg that extends along a side edge of said base element and that is connected directly to a mounting stud of said base element without any further spring portion interposed between said spring leg and said mounting stud, and wherein said mounting stud is thicker and less flexible than said spring leg.

18. A micromechanical rotation rate sensor comprising:

a substrate;

a base element that comprises an inertial mass and that is bounded by two opposite side edges;

four spring elements that movably connect and suspend said base element relative to said substrate;

an excitation arrangement that is arranged and cooperates with said base element so as to be adapted to excite said base element into oscillation in an oscillation direction parallel to said side edges along a major plane of said base element;

a read-out arrangement that is arranged and cooperates with said base element so as to be adapted to sense a motion of said base element in at least one sensing direction perpendicular to said oscillation direction;

four substrate mounting protrusions that protrude from said substrate toward said base element in a transverse direction perpendicular to said oscillation direction and said side edges; and four base mounting protrusions that protrude from said side edges of said base element toward respective ones of said substrate mounting protrusions in said transverse direction;

wherein each respective one of said spring elements comprises a first spring leg extending parallel to said side edges and having a proximal end thereof connected directly to one of said substrate mounting protrusions, a second spring leg extending parallel to said side edges and having a proximal end thereof connected directly to one of said base mounting protrusions, and a junction piece that joins a distal end of said first spring leg with a distal end of said second spring leg, wherein a width of said substrate mounting protrusions and a width of said base mounting protrusions respectively in said major plane and parallel to said side edges is respectively greater than a width of said first spring leg and a width of said second spring leg respectively in said major plane and perpendicular to said side edges, wherein a width of each said junction piece in said major plane and parallel to said side edges is respectively greater than said width of said first spring leg and said width of said second spring leg, and wherein a length of said substrate mounting protrusions and a length of said base mounting protrusions respectively in said major plane and perpendicular to said side edges is respectively less than a length of said first spring leg and a length of said second spring leg respectively in said major plane and parallel to said side edges.

* * * * *